United States Patent [19]
Kato et al.

[11] Patent Number: 5,261,649
[45] Date of Patent: Nov. 16, 1993

[54] ELASTIC MOUNT HAVING MAIN FLUID CHAMBER COMMUNICATING WITH AUXILIARY FLUID CHAMBER PARTIALLY DEFINED BY OSCILLATING PLATE ACTUATED BY MOVING COIL IN ANNULAR GAP BETWEEN TWO YOKES CONNECTED TO PERMANENT MAGNET

[75] Inventors: Rentaro Kato; Tetsu Matsui, both of Kasugai, Japan

[73] Assignee: Tokai Rubber Industries, Ltd., Japan

[21] Appl. No.: 980,240

[22] Filed: Nov. 23, 1992

[30] Foreign Application Priority Data

Nov. 29, 1991 [JP] Japan .................................. 3-341929

[51] Int. Cl.$^5$ .......................... F16M 1/00; F16F 13/00
[52] U.S. Cl. ........................... 267/140.12; 267/140.15
[58] Field of Search .............. 267/219, 140.11, 140.12, 267/140.13, 140.14, 140.15; 248/550, 562, 636

[56] References Cited

U.S. PATENT DOCUMENTS

| 4,650,170 | 3/1987 | Fukushima | 267/140.14 |
|---|---|---|---|
| 4,693,455 | 9/1987 | Andra | 267/140.14 |
| 4,941,649 | 7/1990 | Funahashi et al. | 267/140.12 |
| 5,029,825 | 7/1991 | Doi | 267/140.12 |
| 5,076,550 | 12/1991 | Mayama et al. | 267/140.12 |
| 5,098,072 | 3/1992 | Muramatsu et al. | 267/140.12 |

FOREIGN PATENT DOCUMENTS

| 0163162 | 12/1985 | European Pat. Off. |  |
|---|---|---|---|
| 3423698 | 1/1985 | Fed. Rep. of Germany . | |
| 3825019 | 1/1990 | Fed. Rep. of Germany . | |
| 4040065 | 6/1991 | Fed. Rep. of Germany . | |
| 59-1828 | 1/1984 | Japan . | |
| 60-8540 | 1/1985 | Japan . | |
| 3-89044 | 4/1991 | Japan | 267/219 |
| 3-144133 | 6/1991 | Japan | 267/140.12 |
| 3-73741 | 7/1991 | Japan . | |

Primary Examiner—Matthew C. Graham
Attorney, Agent, or Firm—Parkhurst, Wendel & Rossi

[57] ABSTRACT

A fluid-filled elastic mount wherein an elastic body which elastically connects an inner and an outer sleeve partially defines a pressure-receiving chamber filled with a non-compressible fluid, and an oscillating plate is provided to partially define an auxiliary fluid chamber which cooperates with the pressure-receiving chamber to form a fluid chamber. Two yoke members are connected to respective opposite pole faces of a permanent magnet disposed on one of opposite sides of the oscillating plate remote from the fluid chamber. The yoke members, which cooperate with the permanent magnet to define a closed magnetic circuit, define therebetween an annular gap in the magnetic circuit, in which is received an annular moving coil fixed to the oscillating plate. The coil is axially displaced in the gap to oscillate the oscillating plate upon energization of the coil.

9 Claims, 4 Drawing Sheets

ELASTIC MOUNT HAVING MAIN FLUID CHAMBER COMMUNICATING WITH AUXILIARY FLUID CHAMBER PARTIALLY DEFINED BY OSCILLATING PLATE ACTUATED BY MOVING COIL IN ANNULAR GAP BETWEEN TWO YOKES CONNECTED TO PERMANENT MAGNET

BACKGROUND OF THE INVENTION

1. Field of the Invention

The present invention relates generally to a fluid-filled elastic mount used as a vibration damper such as an engine mount for a motor vehicle, and more particularly to such a fluid-filled elastic mount having a fluid chamber partially defined by an oscillating plate which is actuated by an electromagnetic drive device so as to electrically control the damping characteristics of the mount.

2. Discussion of the Prior Art

As a vibration damper such as an engine mount or a suspension bushing for a motor vehicle, for flexibly connecting two members in a vibration system or mounting one of the two members on the other member in a vibration damping fashion, there is known an elastic mount of bushing type interposed between the two members of the vibration system. The bushing type elastic mount has an elastic body interposed between an inner and an outer sleeve, which are radially spaced apart from each other. The inner and outer sleeves are elastically connected by the elastic body and are fixed to one and the other of the two members of the vibration system.

Keeping pace with recent tendency of upgrading motor vehicles, such elastic mounts of modern vintage for motor vehicles are increasingly required to exhibit improved damping characteristics over a wide frequency range of the vibrations to be damped, and various attempts have been made to develop elastic mounts which meet such a requirement.

In view of the above requirement, there have been proposed various fluid-filled elastic mounts of non-bushing type wherein a first and a second support, which are spaced apart from each other in the load-receiving direction, are elastically connected by an elastic body interposed therebetween. Examples of such non-bushing type elastic mounts are disclosed in JP-A-60-8540, JP-A-59-1828 and Publication No. 3-73741 of unexamined Japanese Utility Model Application, wherein the elastic body partially defines a fluid chamber filled with a non-compressible fluid. The fluid chamber is further partially defined by an oscillating plate which is oscillated by a magnetic or electromagnetic force produced by a solenoid, so as to regulate the fluid pressure within the chamber. Thus, the non-bushing type elastic mount is electrically controlled for adjusting the damping characteristics so as to effectively damp the input vibrations over a wide frequency range.

However, the construction of the known bushing type elastic mount described above is not suitable to incorporate an oscillating plate partially defining a fluid chamber and an electromagnetic drive device such as a solenoid to actuate the oscillating plate, as disclosed in the above-identified publications. Up to the present, no effective measures for improving the damping characteristics of the bushing type elastic mount have been proposed or developed.

In the known electrically controllable fluid-filled elastic mount of the non-bushing type constructed as disclosed in the above-identified publications, the operation of the oscillating plate cannot be easily or suitably regulated so as to enable the elastic mount to exhibit intended damping characteristics, since it is difficult to obtain a sufficient drive force to effectively and stably actuate the oscillating plate. Thus, the known electrically controllable non-bushing type elastic mount is not practically satisfactory in its damping characteristics.

Described more specifically, the above fluid-filled elastic mount suffers from insufficiency of the magnetic flux density in the magnetic field in which the oscillating plate or solenoid coil is placed, because the magnetic path or circuit formed by the solenoid or permanent magnet is open. In particular, the open magnetic circuit leads to insufficiency of the drive force to actuate the oscillating plate so as to effectively regulate the fluid pressure within the fluid chamber, when the elastic mount receives a vibrational load of medium to low frequencies having a relatively large amplitude.

Moreover, when the oscillating plate is actuated or displaced in the oscillating manner, the open magnetic circuit formed by the solenoid or permanent magnet inevitably causes a large variation in the magnetic flux density in the field in which the oscillating plate or coil is placed. As a result, the drive force which acts on the oscillating plate tends to be unstable, making it difficult to effectively control the oscillating plate, whereby the waveform of the pulsation induced within the fluid chamber is distorted, causing a fluid pressure control distortion of the fluid chamber. Thus, the known electrically controllable fluid-filled elastic mount is not satisfactory in terms of its damping characteristics.

Although the oscillating plate can be suitably controlled to regulate the fluid pressure within the fluid chamber so as to exhibit an intended damping effect with respect to the vibrations in a specific frequency band, the distortion of the pulsation waveform of the fluid would result in adversely amplifying the vibrations in another frequency band. Thus, the known fluid-filled elastic mount as a whole is incapable of exhibiting the intended damping characteristics over a wide frequency range of the input vibrations.

SUMMARY OF THE INVENTION

It is therefore an object of the present invention to provide an electrically controllable fluid-filled elastic mount having an oscillating plate partially defining a fluid chamber, which elastic mount is provided with an electromagnetic drive device capable of effectively actuating the oscillating plate.

The above object may be achieved according to the principle of the present invention, which provides a fluid-filled elastic mount wherein an inner and an outer sleeve which are radially spaced apart from each other is elastically connected by an elastic body interposed therebetween, and the elastic body partially defines a pressure-receiving chamber filled with a non-compressible fluid, the elastic body comprising: (a) an oscillating plate which partially defines an auxiliary fluid chamber which communicates with the pressure-receiving chamber, the auxiliary fluid chamber being filled with the non-compressible fluid and cooperating with the pressure-receiving chamber to form a fluid chamber, the oscillating plate being displaceable to change a pressure of the fluid in the fluid chamber; (b) a permanent magnet disposed on one of opposite sides of the oscillating plate remote from the fluid chamber; (c) a first and a second yoke member which are connected to respective opposite magnetic pole faces of the permanent magnet and which cooperate with the permanent magnet to define a closed magnetic circuit, the first and second yoke members defining therebetween an annular gap in the magnetic circuit; and (d) an annular moving coil received in the annular gap and fixed to the oscillating plate, the moving coil being displaced in the annular gap in an axial direction thereof, to oscillate the oscillating plate upon energization of the moving coil.

In the fluid-filled elastic mount of the present invention constructed as described above, the annular moving coil is disposed in the annular gap defined by and between the first and second yoke members, which cooperate with the magnet to define a closed magnetic circuit or path. Accordingly, the present arrangement is effective to minimize the amount of leakage of the magnetic flux, thereby increasing the magnetic flux density at the annular gap and improving the uniformity of the magnetic flux density.

Consequently, the moving coil is exposed to the sufficiently high density of magnetic flux, whereby an accordingly large magnetic force is produced to move the coil upon energization of the coil, irrespective of the axial position of the coil which varies over a predetermined range of operating stroke. This means a large drive force to oscillate the oscillating plate, assuring increased operating stability of the oscillating plate.

The increased operating stability of the oscillating plate with a large drive force assures improved accuracy and stability of regulation of the fluid pressure in the fluid chamber, and enhanced damping characteristics of the elastic mount.

The permanent magnet may be a solid cylinder. In this case, the annular gap is formed radially outwardly of the solid cylinder. In this arrangement, the first yoke member may comprise a base member including a bottom wall portion and a cylindrical wall portion which cooperate to define a cylindrical space, and the second yoke member may comprise a circular disk disposed radially inwardly of the cylindrical wall portion. In this instance, the solid cylinder is disposed within the cylindrical space such that one of opposite axial ends of the solid cylinder of the permanent magnet is in contact with the bottom wall portion of the base member while the other of the opposite axial ends is in contact with the circular disk.

The elastic body may further partially define an equilibrium chamber. In this case, the elastic mount further comprises orifice defining means for defining an orifice passage for fluid communication between the pressure-receiving and equilibrium chambers. The orifice passage is tuned to damp a vibrational load having a frequency within a predetermined range, based on resonance of the non-compressible fluid flowing through the orifice passage upon application of the vibrational load between the first and second supports.

The elastic mount may comprise a mounting bracket for fixing the outer sleeve to one of two members which are connected to each other by the elastic mount in a vibration damping fashion. The mounting bracket may cooperate with the oscillating plate to define the auxiliary fluid chamber.

BRIEF DESCRIPTION OF THE DRAWINGS

The above and other objects, features and advantages of the present invention will be better understood by reading the following detailed description of the preferred embodiments of the invention, when considered in connection with the accompanying drawings, in which.

DETAILED DESCRIPTION OF THE PREFERRED EMBODIMENTS

Figure 1:
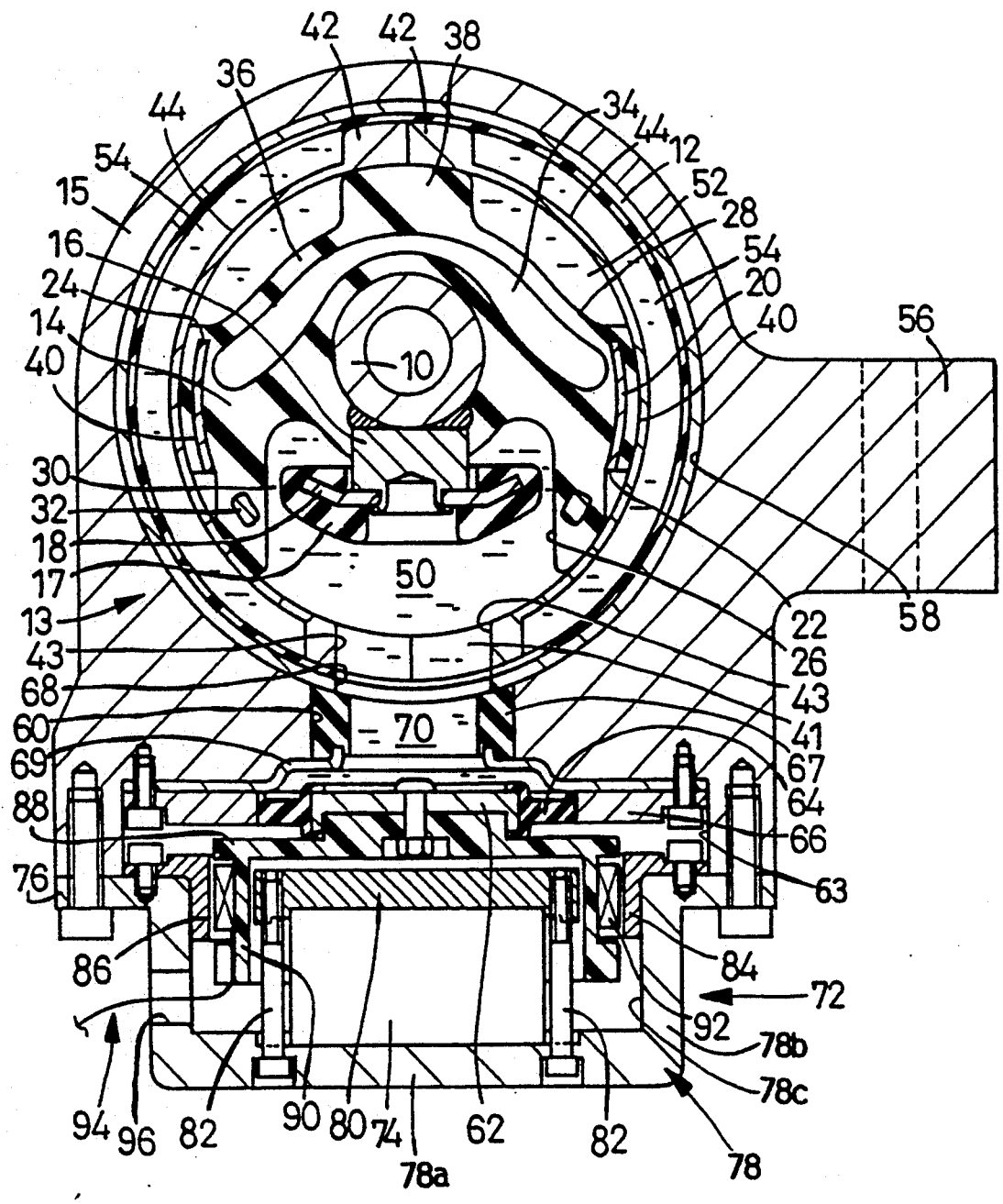
FIG. 1 is an elevational view in transverse cross section of one embodiment of a fluid-filled elastic mount of this invention in the form of an engine mount for a motor vehicle.

Referring first to FIG. 1 showing an electrically controllable fluid-filled elastic engine mount for a front-engine front-drive motor vehicle, the engine mount consists of a mount body 13 and an electromagnetic drive device 72.

The mount body 13 includes a first and a second support in the form of an inner sleeve 10, and an outer sleeve 12 disposed radially outwardly of the inner sleeve 10 such that the two sleeves 10, 12 are eccentric with each other. These two sleeves 10, 12 are made of a metallic material, and are elastically connected to each other by an elastic body 14 interposed therebetween. The mount body 13 includes a mounting bracket 15 in which the outer sleeve 10 is press-fitted. One of the inner and outer sleeves 10, 12 is fixed to one of the vehicle body, while the other sleeve 10, 12 is fixed to a power unit of the vehicle. For instance, the inner sleeve 10 is fixed to the power unit, while the outer sleeve 12 is fixed to the vehicle body through the mounting bracket 15. With the weight of the power unit acting on the inner sleeve 10 as a static load, the elastic body 14 is elastically deformed, and the inner and outer sleeves 10, 12 are radially displaced relative to each other, whereby the two sleeves, 10, 12 are made substantially concentric or arranged in a coaxial relationship with each other. In operation of the engine mount installed on the vehicle as described above, a dynamic vibrational load is applied to the engine mount in a diametric direction (load receiving direction) in which the inner and outer sleeves 10, 12 are initially offset from each other, i.e., in the vertical direction as seen in FIG. 1.

The inner sleeve 10 has a relatively large cylindrical wall thickness. A metallic support block 16 is welded to an axially middle portion of the inner sleeve 10, such that the support block 16 extends in a radial direction. The support block 16 carries a wing member 18 fixed thereto at its lower end. The wing member 18 extends generally in a direction perpendicular to the radial direction of the inner sleeve 10 in which the support block 16 extends. The wing member 18 is embedded in a rubber buffer 17.

Radially outwardly of the inner sleeve 10, there is disposed an intermediate sleeve 20, such that the intermediate sleeve 20 is eccentric with respect to the inner sleeve 10. The intermediate sleeve 20 is also made of a metallic material. The elastic body 14 is a generally cylindrical member connecting the inner and intermediate sleeves 10, 20. The elastic body 14 and the inner and intermediate sleeves 10, 20 constitute an integral inner assembly prepared by vulcanizing an appropriate rubber material for the elastic body 14.

The intermediate sleeve 20 has a first window 22 and a second window 24 which are diametrically opposed to each other with the inner sleeve 10 interposed therebetween in the load receiving direction. The elastic body 14 has a first and a second recess 26, 28 open on its outer circumferential surface through the respective windows 22, 24. In the first recess 26, there is disposed the above-indicated wing member 18 such that the wing member 18 substantially divides the recess 26 into two sections, which are located in respective radially inner and outer portions of the elastic body 14. The wing member 18 cooperates with the inner surface of the elastic body 14 defining the first recess 26, to define an annular resonance portion or restricted fluid passage 30 for fluid communication between the above-indicated two sections of the first recess 26. To prevent irregular deformation of a portion of the elastic body 14 which defines the first recess 126, hat portion has an annular restricting metal member 32 embedded therein.

Figure 2:
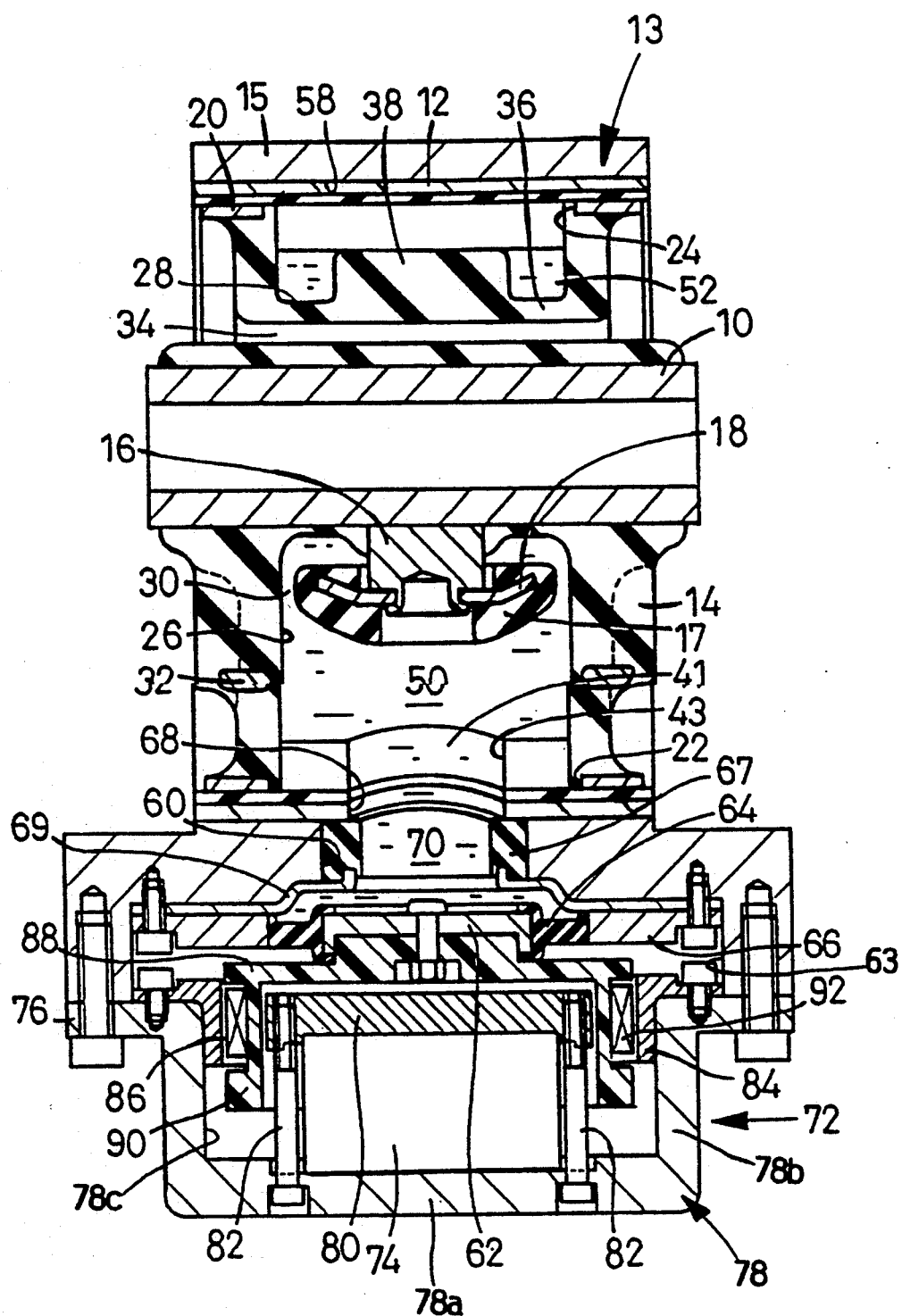
FIG. 2 is an elevational view in axial cross section of the engine mount of FIG. 1.

The elastic body 14 has an axial void 34 formed therethrough so as to extend over the entire axial length, as shown in FIG. 2. The axial void 34 is located between the inner sleeve 10 and the second recess 28. In the presence of this axial void 34, the elastic wall defining the bottom of the second recess 28 is thin-walled as indicated at 36 in FIGS. 1 and 2. The thin elastic wall 36, which is easily elastically deformable or displaceable, is formed with a central thick-walled portion which functions as a stopper 38 for limiting an amount of relative radial displacement of the inner and outer sleeves 10, 12, to thereby prevent excessive deformation of the elastic body 14.

Figure 3:
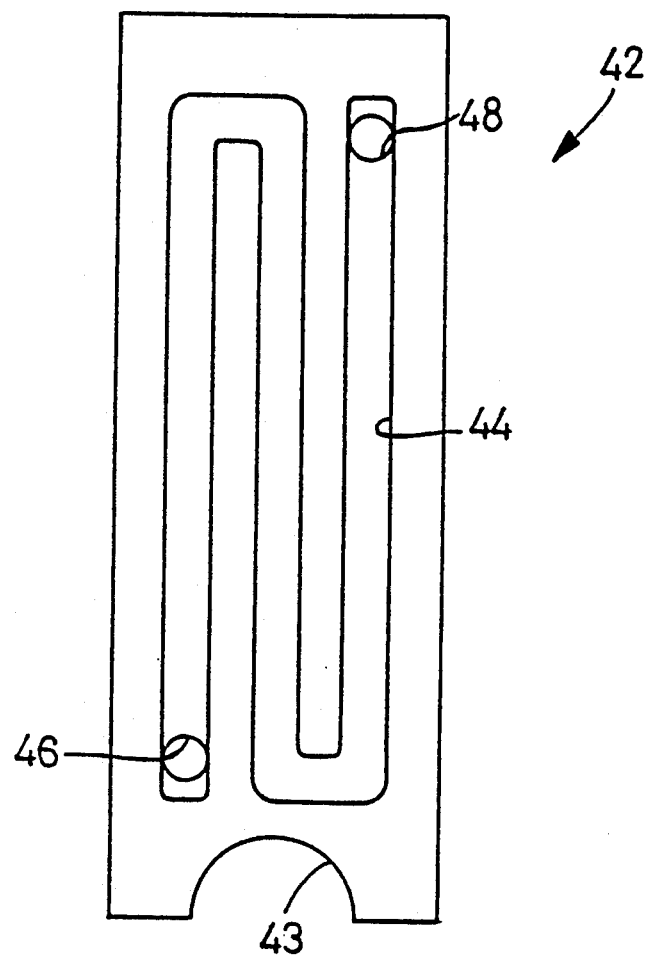
FIG. 3 is a plan view of an orifice-defining member used in the engine mount of FIGS. 1 and 2.

The above-indicated inner assembly 10, 14, 20 of the mount body 13 has two part-circumferential grooves 40, 40 formed in the outer circumferential surface, such that these grooves 40 connect the first and second recesses 26, 28. In these grooves 40, two orifice-defining members 42, 42 are received, respectively. Each of the orifice-defining members 42 has a semi-circular cross sectional shape, so that the two orifice-defining members 42 received in the appropriate part-circumferential grooves 40 constitute a cylindrical member. As shown in FIG. 3, each orifice-defining member 42 has a semi-circular cutout 43 at one of its opposite circumferential ends, at which the two orifice-defining members 42 are butted together. The cutouts 43 of the two orifice-defining members 42 cooperate to define a circular hole 41 which communicates with the first recess 26.

As shown in FIG. 3, each orifice-defining member 42 has a groove 44 which is U-shaped in cross section. The groove 44 has opposite ends adjacent to the opposite ends of the member 42, and is turned 180° near the opposite ends of the member 42, so that the groove 44 has a relatively large length. The member 42 has two communication holes 46, 48 formed through the thickness thereof, for communication with the respective opposite ends of the groove 44 and the respective first and second recesses 26, 28.

The outer sleeve 12 is mounted on the inner assembly 10, 14, 20 with the orifice-defining members 42 received in the part-circumferential grooves 40, such that the outer sleeve 12 is fitted on the outer circumferential surface of the intermediate sleeve 20. As a result, the first and second recesses 26, 28, and the groove 44 are closed by the outer sleeve 12, whose inner circumferential surface is provided with a sealing rubber layer. Thus, the mount body 13 has a pressure-receiving chamber 50 and an equilibrium chamber 52 which correspond to the first and second recesses 26, 28, respectively. These chambers 50, 52 are filled with a non-compressible fluid such as water, alkylene glycol, polyalkylene glycol or silicone oil. Further, the groove 44 cooperates with the communication holes 46, 48 to define an orifice passage 54 for fluid communication between the pressure-receiving chamber 50 and the equilibrium chamber 52.

Upon application of a vibrational load between the inner and outer sleeves 10, 12 in the load receiving direction, the pressure of the fluid within the pressure-receiving chamber 50 changes due to elastic deformation of the elastic body 14. On the other hand, a fluid pressure change in the equilibrium chamber 52 is substantially absorbed by elastic deformation or displacement of the thin elastic wall 36, which causes a change in the volume of the equilibrium chamber 52. Accordingly, there arises a difference between the fluid pressures in the two fluid chambers 50, 52, whereby the fluid is forced to flow between the two chambers 50, 52 through the orifice passage 54. As is well known in the art, the vibration applied is damped based on the resonance of the fluid flowing through the orifice passage. That is, the length and cross sectional area of the orifice passage 54 are tuned or determined so as to enable the present engine mount to exhibit an intended damping effect with respect to low-frequency vibrations such as shake having a relatively large amplitude, based on the resonance of the fluid flowing through the orifice passage 54.

The mount body 13 constructed as described above is held in the mounting bracket 15. More specifically, the bracket 15 has a cylindrical portion with a bore 58 in which the mount body 13 is press-fitted. The bracket 15 further has a mounting portion 56 radially outwardly extending from the cylindrical portion, so that the mount body 13 is secured at the mounting portion 56 to the vehicle body or vehicle power unit.

The outer sleeve 12 has a through-hole 68 which communicates with the pressure-receiving chamber 50 through the circular hole 41 of the orifice-defining members 42. On the other hand, the mounting bracket 15 has an aperture 60 which communicates with the pressure-receiving chamber 50 through the through-hole 68 and the circular hole 41.

The mounting bracket 15 has a circular recess 63 open at its lower end as seen in FIGS. 1 and 2. The circular recess 63 is formed in communication with the aperture 60 and has a diameter considerably larger than that of the aperture 60. Within this circular recess 63, there is disposed an oscillating plate 62 fixed to an annular retainer ring 66 through an annular elastic support 64. That is, the oscillating plate 62 is bonded at its circumference to the elastic support 64, which in turn is supported by the retainer ring 66 bolted to the bracket 15. The elasticity of the elastic support 64 permits the oscillating plate 62 to be easily displaceable in its axial direction.

The annular elastic support 64 and oscillating plate 62 fluid-tightly close the aperture 60, whereby an auxiliary fluid chamber 70 is formed in communication with the pressure-receiving chamber 50. Thus, the oscillating plate 62 partially defines the auxiliary fluid chamber 70, which cooperates with a main fluid chamber in the form of the pressure-receiving chamber 50 to form a fluid chamber which communicates with the equilibrium chamber 52 through the orifice passage 54.

To secure fluid tightness between the pressure-receiving chamber 50 and the auxiliary fluid chamber 70, a sealing rubber sleeve 67 is disposed within the aperture 60. The rubber sleeve 67 is axially forced against the outer circumferential surface of the outer sleeve 12, by a pressure plate 69 bolted to the bracket 15.

The oscillating plate 62 is actuated by an electromagnetic drive device 72 attached to the mounting bracket 15. The drive device 72 is disposed on one of opposite sides of the oscillating plate 62 remote from the fluid chamber 50, 70.

The electromagnetic drive device 72 includes a permanent magnet 74 in the form of a solid cylinder having opposite magnetic poles or pole faces at its axially opposite ends. The permanent magnet 74 is accommodated in a ferromagnetic base member 78 which has a bottom wall portion 78a and a cylindrical wall portion 78b. More specifically, the magnet 71 is positioned in a cylindrical space 78c defined by the cylindrical and bottom wall portions 78a, 78b of the base member 78, such that the lower pole face of the magnet 74 is in contact with a radially central portion of the bottom wall portion 78a of the base member 78. The base member 78 has an outward flange 76 at the open end of the cylindrical wall portion 78b, and is bolted at its outward flange 76 to the mounting bracket 15, such that the cylindrical space 78c is open toward the oscillating plate 62.

A ferromagnetic circular end disk 80 having a relatively large thickness is disposed in contact with the upper pole face of the permanent magnet 76. The end disk 80 has a diameter which is larger than that of the magnet 74 and smaller than the inside diameter of the cylindrical wall portion 78b of the base member 78. The end disk 80 is forced onto the pole face of the magnet 74, by fastening means in the form of a plurality of screws 82, which fixes the end disk 80 to the base member 78 such that the permanent magnet 74 is tightly gripped by and between the end disk 80 and the bottom wall portion 78a of the base member 78. The screws 82 are screwed into the peripheral portion of the end disk 80, which protrudes radially outwardly from the periphery of the pole face of the magnet 74.

At the open end of the cylindrical wall portion 78b of the ferromagnetic base member 80, there is disposed a ferromagnetic annular member 84 bolted to the outward flange 76. This annular member 84 includes a cylindrical portion whose outer circumferential surface is in contact with the inner circumferential surface of the cylindrical wall portion 78b of the base member 78. With the annular member 84 thus attached to the base member 78, there exists a given radial spacing between the inner circumferential surface of the cylindrical portion of the annular member 84 and the opposite outer circumferential surface of the end disk 80.

The base member 78, end disk 80 and annular member 84 are all made of an iron or other ferromagnetic material, so that there is formed a closed magnetic path or circuit. The end disk 80 and the annular member 84 which partially define the closed magnetic circuit cooperate to define therebetween an annular or cylindrical gap 86.

In the present embodiment, the base member 78 and annular member 84 function as a first yoke member connected to the lower pole face of the permanent magnet 74, while the end disk 80 functions as a second yoke member connected to the upper pole face of the magnet 74. These first and second yoke members cooperate with the magnet 74 to provide the closed magnetic circuit. The screws 82 connecting the base member 78 and the end disk 80 are made of a non-magnetic material such as an aluminum alloy, to prevent shorting of the magnetic circuit.

Within the annular gap 86 between the end disk 80 and the annular member 84, there is disposed an annular moving coil 92 which is axially movable within the annular gap 86. The moving coil 92 is supported by a cylindrical movable member 88 made of a non-magnetic material such as a synthetic resin or aluminum alloy. The movable member 88 has a cylindrical portion 90 extending through the annular gap 86.

The annular moving coil 92 is secured to the outer circumferential surface of the cylindrical portion 90 of the movable member 88, so that the movable member 88 is moved with the coil 92 when the coil 92 is moved with an electric current applied thereto as described below, through conductor wire 94 extending through hole 96 formed through the cylindrical wall portion 78b of the base member 78. To permit axial movements of the cylindrical portion 90 and the coil 92, small radial clearances are provided between the end disk 80 and the cylindrical portion 90, and between the coil 92 and the annular member 84.

The axial length of the annular coil 92 is selected to be smaller than the axial length of the cylindrical portion of the annular member 84, so that the coil 92 axially displaced within the ga 86 is always positioned within the axial length of the annular member 84, in order to assure a substantially constant density of magnetic flux applied to the coil 92, irrespective of the axial position of the coil 92.

The electromagnetic drive device 72 is bolted, at the outward flange 76 of the base member 78, to the lower end of the mounting bracket 15. At the same time, the base wall of the movable member 88 is bolted to the underside of the oscillating plate 62. In this condition, the annular moving coil 92 is located at an axially middle portion of the annular gap 86.

In operation of the engine mount constructed as described above, the moving coil 92 is energized by a controlled alternating current, whereby the coil 92 is subject to an electromagnetic force (Lorentz force) produced according to the Fleming's left-hand rule, so that the coil 92 is moved with the movable member 88. As a result, the oscillating plate 62 is displaced with a force proportional to the amount of electric current applied to the coil 92. The oscillating plate 62 is oscillated by controlling the current applied to the coil 92, depending upon the pressure change in the pressure-receiving chamber 50 due to the input vibrational load. Thus, the fluid pressure in the chamber 50 can be effectively regulated so as to change the damping characteristic of the engine mount, depending upon the type of vibration received.

Described in detail, when the frequency of the input vibration is relatively low, the oscillating plate 62 is oscillated in the same phase as the input vibration, so as to positively cause a fluid pressure change in the pressure-receiving chamber 50, for increasing the amount of the fluid which flows through the orifice passage 54, and thereby improving the damping effect based on the fluid flow through the orifice passage 54. When the frequency of the input vibration is in a medium or low band, the phase of oscillation of the oscillating plate 62 is reversed with respect to that of the input vibration, to thereby absorb the fluid pressure change in the chamber 50 or reduce the amount of the fluid pressure change, so that the engine mount exhibits an effectively reduced dynamic spring constant with respect to the medium to low frequency vibration.

In the electromagnetic drive device 72 of the present engine mount, the magnetic field to which the moving coil 92 is exposed has a sufficiently high magnetic flux density, with a reduced amount of magnetic flux leakage from the permanent magnet 74, since the magnetic field is produced at the annular gap 86 provided in the closed magnetic circuit or path. Consequently, upon energization of the moving coil 92, a sufficiently large magnetic force is produced to actuate the oscillating plate 62 so as to suitably regulate the fluid pressure in the pressure-receiving chamber 50, and thereby exhibit optimum damping characteristics depending upon the type of the input vibration, without increasing the complexity and size of the electromagnetic drive device 72. The sufficiently high magnetic flux density at the annular gap 86 permits the use of the magnet 74 whose magnetic force is relatively small, namely, the magnet 74 whose size is relatively small, which permits the engine mount to be relatively small-sized as a whole.

As the magnetic field in which the moving coil 92 is placed is produced at the annular gap 86 in the closed magnetic circuit or path defined by the component 74, 78, 80, 84, the magnetic flux density in the magnetic field and the magnetic force produced are made uniform throughout the field, irrespective of the axial position of the coil 92 which is axially moved within the gap 86. This arrangement permits the produced magnetic force to be substantially proportional to the amount of electric current to be applied to the moving coil 92, whereby the oscillation of the oscillating plate 62 can be comparatively easily controlled, with an effectively reduced amount of distortion of waveform of the fluid pressure pulsation in the pressure-receiving chamber 50. Thus, the present engine mount is capable of intricately and precisely controlling the fluid pressure within the chamber 50, so as to exhibit improved damping stability with respect to the input vibrations over a wide frequency range. Accordingly, the present engine mount is substantially free from the conventionally experienced problem that the distortion of the pulsation waveform results in amplifying the vibration whose frequency is outside the frequency band of the vibrations which can be effectively damped by the aid of the oscillating plate 62.

While the present invention has been described in detail with its presently preferred embodiments with certain degrees of particularity, it is to be understood that the invention is not limited to the details of the illustrated embodiments, but may be otherwise embodied.

In the illustrated embodiment, the electromagnetic drive device 72 is applied to the engine mounts having the equilibrium chamber 52 which communicants with the pressure-receiving chamber 50 (fluid chamber 50, 70) through the orifice passage 54. However, the present invention is applicable to a fluid-filled elastic mount which does not have such an equilibrium chamber and orifice passage arrangement and which is adapted to damp input vibrations by suitably regulating the fluid pressure in the pressure-receiving chamber 50 by the oscillating plate 62. That is, the electromagnetic drive device 72 is effective to control the oscillating plate 62 so as to damp the input vibrations.

The yoke members which cooperate with the permanent magnet 74 to define a closed gap (86) are not limited to the members 78, 86, 84 used in the illustrated embodiment, but may be suitably modified, in size and configuration, for example, provided an annular gap accommodating an annular coil (92) is formed behind the oscillating plate 62.

Figure 4:
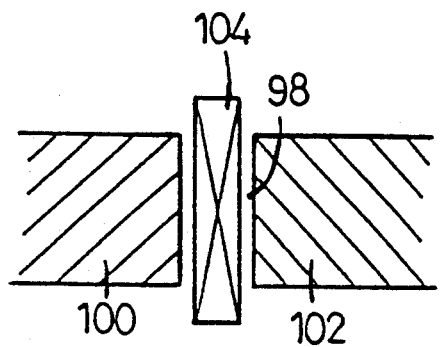
FIGS. 4 and 5 are fragmentary schematic views in cross section showing modifications of the above embodiment of the invention, in terms of the size of an annular moving coil relative to an annular gap in an electromagnetic drive device for the engine mount.
Figure 5:
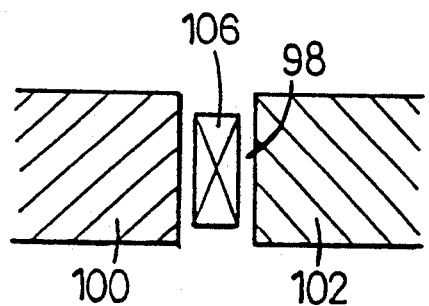

Further, the axial length of the annular coil 92 relative to the corresponding dimension of the members 80, 84 defining the annular gap may be suitably selected. For instance the coil 92 may be replaced by coils 104, 106 as shown in FIGS. 4 and 5, to assure substantially uniform magnetic flux density at the annular gap respective of the axial position of the coil The coil 104 of FIG. 4 has an axial length considerably larger that the axial dimension of an annular gap 98 defend by yoke members 100, 102. The coil 106 of FIG. 5 has an axial length sufficiently smaller than the axial dimension of the gap 98.

While the illustrated fluid-filled elastic mounts are all engine mounts for a motor vehicle, the principle of the present invention is equally applicable to other types of vehicle damping devices such as vehicle body mounts and differential mounts, and even to vibration dampers or elastic mounts used in various equipment or systems other those for motor vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount comprising:
   an inner and an outer sleeve which are radially spaced apart from each other;
   an elastic body interposed between said inner and outer sleeves and elastically connecting said inner and outer sleeves, said elastic body partially defining a pressure-receiving chamber filled with a non-compressible fluid;
   an oscillating plate partially defining an auxiliary fluid chamber which communicates with said pressure-receiving chamber, said auxiliary fluid chamber being filled with said non-compressible fluid and cooperating with said pressure-receiving chamber to form a fluid chamber, said oscillating plate being displaceable to change a pressure of said fluid in said fluid chamber;
   a permanent magnet disposed on one of opposite sides of said oscillating plate remote from said fluid chamber;
   a first and a second yoke member which are connected to respective opposite magnetic pole faces of said permanent magnet and which cooperate with said permanent magnet to define a closed magnetic circuit, said first and second yoke members defining therebetween an annular gap in said magnetic circuit; and
   an annular moving coil received in said annular gap and fixed to said oscillating plate, said annular moving coil being displaced in said annular gap in an axial direction thereof, to oscillate said oscillating plate upon energization of said annular moving coil.

2. A fluid-filled elastic mount according to claim 1, wherein said permanent magnet consists of a solid cylinder, and said annular gap is formed radially outwardly of said solid cylinder.

3. A fluid-filled elastic mount according to claim 2, wherein said first yoke member comprises a base member including a bottom wall portion and a cylindrical wall portion which cooperate to define a cylindrical space, said second yoke member comprising a circular disk disposed radially inwardly of said cylindrical wall portion, said solid cylinder being disposed within said cylindrical space such that one of opposite axial ends of said solid cylinder of said permanent magnet is in contact with said bottom wall portion of said base member while the other of said opposite axial ends is in contact with said circular disk.

4. A fluid-filled elastic mount according to claim 3, wherein said first yoke member further comprises an annular member fixed to said cylindrical wall portion of said base member, said annular member having an inner circumferential surface which cooperates with an outer circumferential surface of said circular disk to define therebetween said annular gap.

5. A fluid-filled elastic mount according to claim 3, further comprising fastening means for fixing said circular disk to said bottom wall portion of said base member such that said solid cylinder of said permanent magnet is tightly gripped by and between said circular disk and said bottom wall portion.

6. A fluid-filled elastic mount according to claim 1, further comprising a movable member which is fixed to said oscillating plate and to which said annular moving coil is fixed to displace said oscillating plate with said movable member and said annular moving coil upon energization of said annular moving coil.

7. A fluid-filled elastic mount according to claim 1, further comprising an elastic support member which elastically supports said oscillating plate, so as to permit an oscillating movement of said oscillating plate by said annular moving coil.

8. A fluid-filled elastic mount according to claim 1, wherein said elastic body further partially defines an equilibrium chamber, said elastic mount further comprising orifice defining means for defining an orifice passage for fluid communication between said pressure-receiving and equilibrium chambers, said orifice passage being tuned to damp a vibrational load having a frequency within a predetermined range, based on resonance of said non-compressible fluid flowing through said orifice passage upon application of said vibrational load between said first and second supports.

9. A fluid-filled elastic mount according to claim 1, further comprising a mounting bracket for fixing said outer sleeve to one of two members which are connected to each other by the elastic mount in a vibration damping fashion, said mounting bracket cooperating with said oscillating plate to define said auxiliary fluid chamber.

* * * * *